(12) United States Patent
Zhang (10) Patent No.: US 8,331,357 B2
(45) Date of Patent: Dec. 11, 2012

(54) COMPUTER TELEPHONY USING A CIRCUIT-SWITCHED NETWORK

(75) Inventor: Yangling Zhang, Batavia, IL (US)

(73) Assignee: Alcatel Lucent, Paris (FR)

( * ) Notice: Subject to any disclaimer, the term of this patent is extended or adjusted under 35 U.S.C. 154(b) by 570 days.

(21) Appl. No.: 11/084,887

(22) Filed: Mar. 21, 2005

(65) Prior Publication Data
US 2006/0209811 A1 Sep. 21, 2006

(51) Int. Cl.
*H04L 12/66* (2006.01)
*H04L 12/50* (2006.01)
*H04L 12/28* (2006.01)

(52) U.S. Cl. ........ 370/355; 370/360; 370/392; 370/420; 370/422; 370/493; 370/498; 370/535; 370/537

(58) Field of Classification Search .................. 370/351, 370/355, 357, 389, 394, 458, 498, 535
See application file for complete search history.

(56) References Cited

U.S. PATENT DOCUMENTS

| | | | | |
|---|---|---|---|---|
| 5,892,764 | A * | 4/1999 | Riemann et al. | 370/401 |
| 5,912,888 | A * | 6/1999 | Walsh et al. | 370/355 |
| 6,208,639 | B1 * | 3/2001 | Murai | 370/356 |
| 6,263,016 | B1 * | 7/2001 | Bellenger et al. | 375/222 |
| 6,356,593 | B1 * | 3/2002 | Dagedeviren et al. | 375/242 |
| 6,400,708 | B1 * | 6/2002 | Bartholomew et al. | 370/352 |
| 6,771,763 | B1 * | 8/2004 | Hagirahim et al. | 379/219 |
| 2002/0001317 | A1 * | 1/2002 | Herring | 370/493 |
| 2002/0018463 | A1 * | 2/2002 | Rabenko | 370/352 |
| 2002/0145998 | A1 * | 10/2002 | Hagirahim | 370/352 |
| 2003/0223407 | A1 * | 12/2003 | Sharma et al. | 370/352 |
| 2004/0196833 | A1 * | 10/2004 | Dahan et al. | 370/352 |
| 2010/0220715 | A1 * | 9/2010 | Cherchali et al. | 370/352 |

* cited by examiner

*Primary Examiner* — Yemane Mesfin
*Assistant Examiner* — Christine Duong
(74) *Attorney, Agent, or Firm* — Carmen Patti Law Group, LLC (57) ABSTRACT

Apparatus for placing a plurality of computer-assisted compressed-voice subscriber calls using a circuit-switched signal path in a distributed telecommunications network. A plurality of vocoders receive voice data from respective subscriber voice devices and output substantially continuous compressed-voice data signals which are arranged by a plurality of packetizers into compressed-voice data packets. A plurality of network adapters send the compressed-voice data packets to a circuit-switched telephone network. A plurality of sequencers remove the substantially continuous compressed-voice data signals from the compressed-voice data packets. A multiplexer coupled to the sequencers combines the compressed-voice data signals into a compressed-voice data package and a signal injector injects the compressed-voice data package into a prearranged time slot of a conventional circuit-switched signal path. Upon arrival at the destination, the time slot carrying the compressed-voice data is disassembled and compressed-voice data is routed to destination subscriber premises. Circuit-switched telephone networks can now be employed to carry compressed voice, allowing simultaneous voice and data communications, while still providing low cost and high quality voice service.

15 Claims, 6 Drawing Sheets

COMPUTER TELEPHONY USING A CIRCUIT-SWITCHED NETWORK

TECHNICAL FIELD

The invention relates generally to telecommunications networks and more particularly to computer telephony in which multiple calls originating from computers are made through a circuit-switched network.

BACKGROUND

With the advent of personal computers, there has been an increasing emphasis in transmitting computer-related traffic over packet-switched telecommunication networks. In these types of known networks, data being transported between subscribers' computers is packetized, that is, the data is divided into a number of data portions, each having a header containing an ID number, source and destination addresses and oftentimes error-control data. Each packet is transmitted individually and can follow different routes to its destination. Once all the packets forming a message arrive at the destination, they are reassembled into the original data stream.

In contrast, known circuit switching technology, which preceded the advent of personal computers, establishes a dedicated line or circuit path between subscribers. When transmitting in real-time, data such as live audio and video must be transmitted at high speeds and must arrive in the same order in which it is sent. The advantages of circuit switching technology in these applications are well-known. Circuit-switched networks transmitting voice bandwidth traffic over voice lines have been established over relatively long periods of time and many features of enhanced flexibility and efficiency have been developed.

Circuit-switched networks have a proven quality of service sought after by operators and users of packet switched networks. Also, subscribers who own or have access to general-purpose computers are seeking improvements in telecommunication services that take advantage of their local computing resources. A need exists for improved computer-assisted telecommunications systems which offer improved quality of service without incurring substantial costs for new resources, and which can efficiently employ existing resources for such improvement.

SUMMARY

The invention in one implementation encompasses an apparatus. The apparatus is employed for placing a plurality of subscriber calls using the subscriber's computer in a conventional circuit-switched signal path in a distributed telecommunications network. The apparatus includes vocoder equipment of a known type which samples the subscriber's voice and software residing in the subscriber's computer assembles the digital data stream into compressed-voice data packets, which are then sent to the telecommunications office by modem. Equipment in the telecommunications office recognizes the compressed-voice data packets and signal extractor equipment extracts the digital data. A multiplexer combines digital data from multiple subscribers and the combined data is loaded or injected into a time slot of a known time division multiplexed circuit path which travels over the public switched telephone network to a destination telecommunications office. The time slot is then unloaded and the data is divided for sending to the local destination subscribers.

Another implementation of the invention encompasses a method employing a single circuit-switched signal path to transmit and receive specially prepared compressed-voice data packets. Subscribers' voice signals are digitized into compressed-voice data streams using a plurality of vocoders. The data streams are then divided into packets and sent via a modem to the local switching office. A plurality of compressed-voice modules in the local switching office include signal extractors which extract the compressed-voice data streams from the compressed-voice data packets of several subscribers. The compressed-voice data streams are then combined for injection into a time slot of a conventional time division multiplexed signal path, and transmitted over the public switched telephone network. Upon arrival at a destination local office, data in the time slot is divided into individual compressed-voice data streams and packetized. The compressed-voice data packets are then sent to the subscribers where the compressed-voice data streams are extracted from the packets and directed to the subscribers' telephones or other audio devices.

Another implementation of the invention encompasses apparatus for use by multiple subscribers having computational devices such as personal computers, employing digitizing devices which sample their voice data at a relatively low rate and which divide the resulting digital data stream into packets. The packets are transmitted to a local switching office which combines packets from multiple subscribers into a prearranged time slot of a known type of time division multiplexed signal path. In one embodiment, there is provided an apparatus comprising a plurality of vocoders receiving voice data from respective subscriber voice devices, such as a telephone or microphone, and outputting respective substantially continuous compressed-voice data signals. A plurality of packetizers, such as known computer resources residing in software or dedicated hardware, received respective substantially continuous compressed-voice data signals and output compressed-voice data packets. A plurality of network adapters, such as modems of known construction, send the respective compressed-voice data packets to a plurality of respective sequencers which receive the compressed-voice data packets and remove therefrom the substantially continuous compressed-voice data signals. A multiplexer coupled to the plurality of sequencers combines the compressed-voice data signals from a plurality of sequencers into a compressed-voice data package. A signal injector injects the compressed-voice data package into a prearranged time slot of a known type of time division multiplexed circuit-switched signal path.

According to other aspects of the present invention, there is provided a method for transmitting compressed-voice data packets of a plurality of subscribers utilizing a time slot of a known type of time division multiplexed circuit-switched signal path. In one embodiment, a method is provided, comprising the steps of digitizing a plurality of subscribers' voice data signals into respective ones of a plurality of substantially continuous compressed-voice data signals having a prearranged data rate. The plurality of substantially continuous compressed-voice data signals are arranged into a plurality of compressed-voice data packets which are then sent to a circuit-switched telephone network where the plurality of substantially continuous compressed-voice data signals is recovered from the plurality of compressed-voice data packets. The plurality of substantially continuous compressed-voice data signals are then combined to form a compressed-voice data package which is injected into a prearranged time slot of a circuit-switched signal path of a distributed circuit-switched telephone network. Upon arrival at the destination, the time slot carrying the compressed-voice data is disassembled and compressed-voice data is routed to destination subscriber premises.

DESCRIPTION OF THE DRAWINGS

Features of exemplary implementations of the invention will become apparent from the description, the claims, and the accompanying drawings in which:

DETAILED DESCRIPTION

Figure 1:
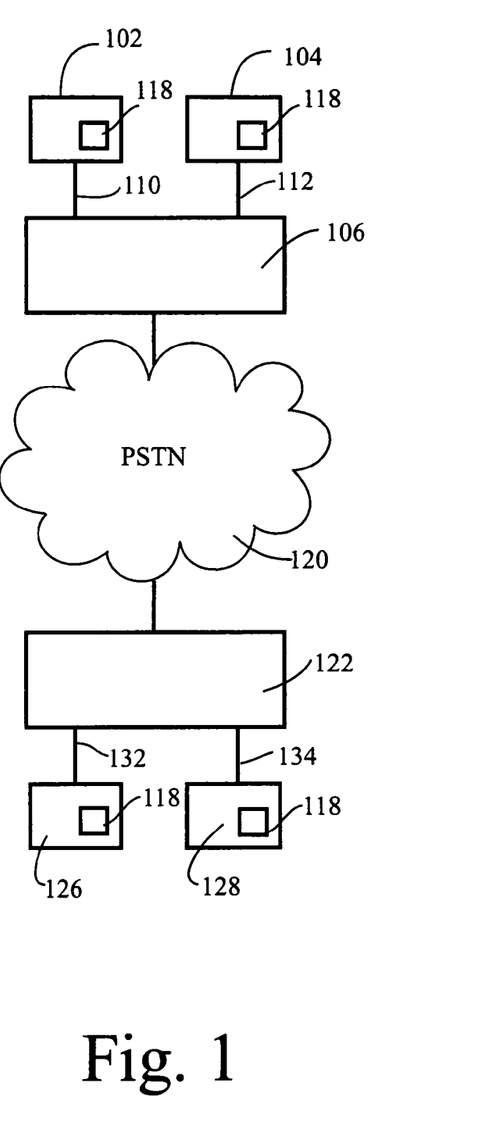
FIG. 1 is a representation of one implementation of a compressed-voice apparatus that prepares compressed-voice data packets for use in a public switched telephone network.

Turning to FIG. 1, an apparatus for placing computer-assisted calls is incorporated in a distributed telecommunications network 100 of known circuit switching type. As will be seen herein, the telecommunications network 100 has been modified according to one embodiment of the invention. In broad terms, the telecommunication network 100 includes first and second originating subscriber premises 102, 104 coupled to a local switching office 106 by local loops 110, 112, and first and second destination subscriber premises 126, 128 coupled to a second local switching office 122 by local loops 132, 134. Resources according to certain aspects of the present invention are located at the subscriber's premises and at the local switching offices, as will be described herein. Included at the subscriber premises are computational devices such as programmable computers 118 or dedicated electronic devices which are employed in placing the computer-assisted calls. Compressed-voice data for multiple subscribers is prepared according to one embodiment of the present invention and, in a known manner, is loaded into a dedicated time slot of a conventional time division multiplexed circuit path, and is transmitted over a public switched telephone network (PSTN) 120 to its destination. Upon arrival at the destination local switching office 122, the time slot carrying the compressed-voice data is disassembled and compressed-voice data is routed to the destination subscriber premises 126, 128.

Figure 2:
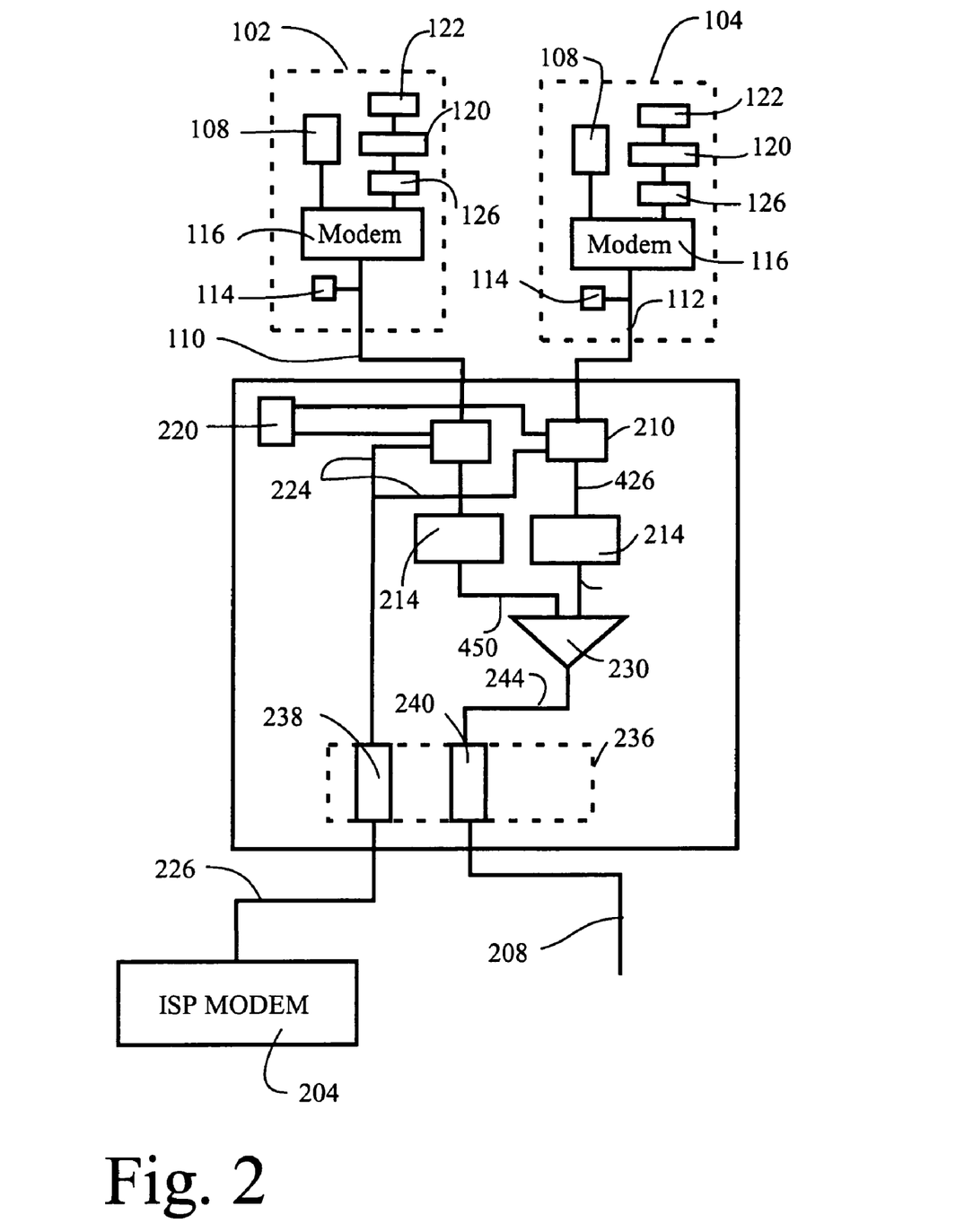
FIG. 2 is a partial representation of the compressed-voice apparatus of FIG. 1.
Figure 3:
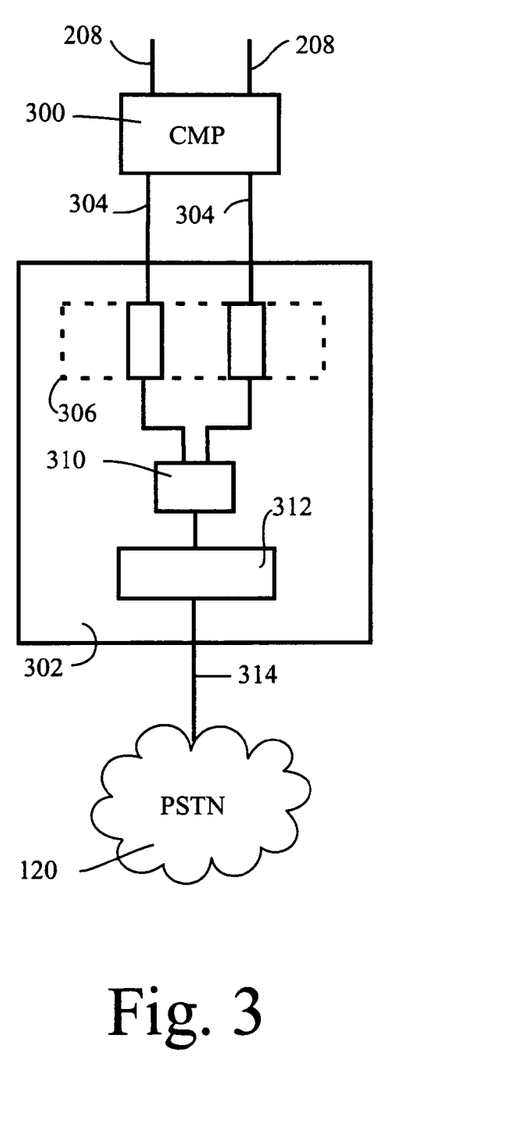
FIG. 3 is another partial representation of the compressed-voice apparatus of FIG. 1.

Turning now to FIGS. 2 and 3, that portion of telecommunications network 100 preceding the PSTN is shown in greater detail. Referring to FIG. 2, the subscriber premises 102, 104 include known equipment such as a telephone instrument 114 and a computational device such as a general-purpose programmable computer at each subscriber's premises, which has a portion of its resources 108 allocated to web applications or other purposes not related to computer-assisted calls. Data to be transmitted to the local switching office which is not related to computer-assisted calls, so-called non-telephone call data or IP data, remains unaffected by the computer-assisted calls and travels through the telecommunications network in a known manner. Modems 116 provide communication over the voice line or local loops 110, 112 as voice bandwidth traffic. Modems 116 can be of any known type and preferably do not require modification for operation with apparatus according to the invention.

Turning again to FIG. 2, apparatus for placing computer-assisted telephone calls includes a vocoder 120 receiving input from a subscribers voice device 122 such as a telephone instrument or microphone of known type. In the preferred embodiment, the voice device 122 outputs an analog signal to vocoder 120, which samples output from the voice device, converting it to a substantially continuous compressed-voice data signal. According to one aspect of the present invention, the output from vocoder 120 comprises a substantially continuous bitstream having a prearranged data speed or bit rate. As will be seen herein, the bit rate is set to a fraction of the bit rate of the known time division multiplexed signal employed in the local switching office, so as to be compatible with existing telecommunications equipment, thereby avoiding the cost of substantial modifications to the telecommunications infrastructure. In other aspects, the bit rate of the vocoder output is chosen so that the bit rate of the time division multiplexed signal employed in the local switching office can, with use of a single time slot of the time division multiplexed signal, accommodate a plurality of subscribers placing computer-assisted calls utilizing methods an apparatus according to the present invention. Those skilled in the art will recognize that reference herein to "substantially" continuous data of various types bears significance to the particular implementation involved, and that some implementations are more sensitive to less than perfect data continuity than others.

Referring again to FIG. 2, the bitstream output of a vocoder 120 is processed by a packetizer 126 which arranges the compressed-voice data bitstream into compressed-voice data packets. Preferably, the compressed-voice data packets include both data and a header containing an ID number and other information, as may be desired. For example, the packet header can contain source and destination addresses, as well as an error-control data. The compressed-voice data packet can be arranged according to virtually any protocol in use today, but preferably is arranged according to known IP protocol, and has a header identifying the computer-assisted call nature of the data. Any non-call related data packets, such as IP data packets from the web applications, are transmitted with the compressed-voice data packets to the local switching office in a known manner as voice bandwidth traffic via known voice lines or end loops, by modems 116.

As indicated in the representation of the subscriber's premises 102, 104, telephone instruments 114 are connected to local loops 110, 112, downstream of modems 116. The telephone instruments 114 are of a type known in the art, and can comprise virtually any type of telephone instrument in use today. Like the traffic from the web applications, voice traffic from telephone instruments 114 function in a known manner, and function apart from the computer-assisted, compressed-voice telephone calls according to methods and apparatus of the present invention. Resources at the subscriber's premises 102, 104, in one example can comprise one or more electronic components, hardware or software components. For example, the computer resources 108 allocated to web applications, in one embodiment, reside in memory located in the subscriber's general-purpose computer. Also, the vocoder 120 and packetizer 126, in one embodiment, can comprise a set and/or series of computer instructions written in or implemented with any number of programming languages, as will be appreciated by those skilled in the art. Various constructions and operations of the vocoder 120 and the packetizer 126 are known in the art. If desired, one or more of the resources located in the subscriber's premises can be implemented by a dedicated electronic apparatus using large scale integration or other known techniques. For example, the vocoder 120 and/or the packetizer 126 can be implemented in a peripheral device external or internal to the subscriber's general-purpose computer. Alternatively, if desired, the subscriber's general-purpose computer described herein can be replaced by dedicated stand-alone electronic apparatus. Such apparatus could also include the voice device and/or any non-call related features desired by the subscriber.

Referring again to FIG. 2, the loops 110, 112 are connected to a local switching office having a switching module 200. In the embodiment illustrated in FIG. 2, switching module 200 is generally of a type commonly employed in a circuit-switched telecommunications network. The signals received on local loops 110, 112 are inputted to respective line units 210. With brief reference to FIG. 4, line units 210 include a 2 wire-to-4 wire converter 412, which splits the subscriber's traffic into outgoing and incoming paths 416, 418. As will be seen herein, line units 210 include a plurality of toggles for routing subscriber's traffic into or around the compressed-voice module 214. Referring again to FIG. 2, signals from the subscriber's premises leaving line units 210 are inputted to compressed-voice modules 214 which prepare the subscriber's compressed-voice data packets for transmission along a known time division multiplexed signal path of a type commonly employed in known circuit-switched telecommunications networks. One advantage provided by methods and apparatus according to principles of the present invention is that subscriber's compressed-voice data traffic can be carried by known circuit-switched telecommunications networks without requiring modification to established equipment and operational procedures employed at the trunk level and beyond. Accordingly, with a minimum of expense to their providers, subscribers placing computer-assisted compressed-voice calls can enjoy the quality of service traditionally enjoyed by subscribers of circuit-switched telecommunications networks.

Figure 4:
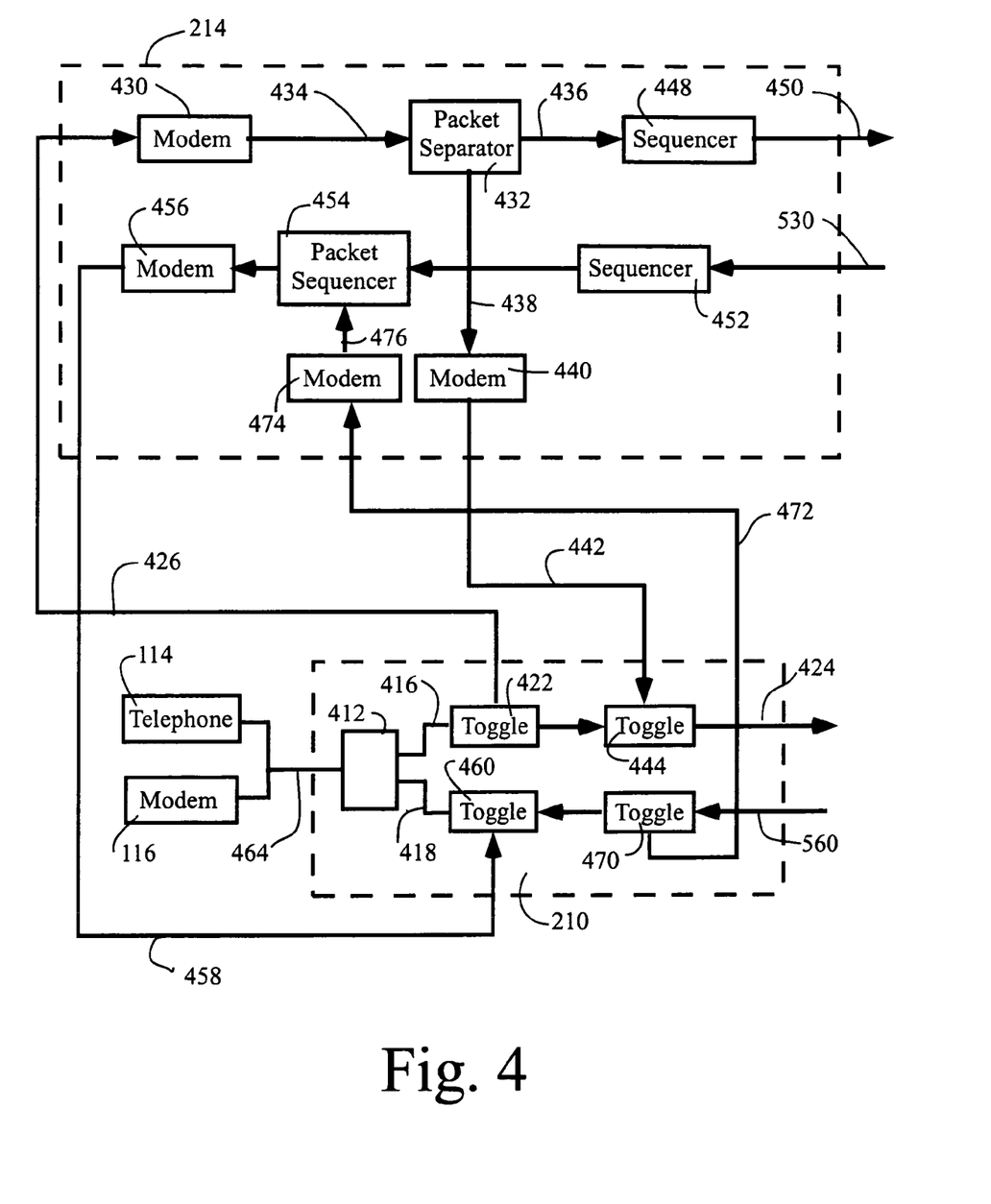
FIG. 4 is a representation of line unit and compressed-voice module apparatus.

Referring now to FIG. 4, line switch 210 receives the traffic from the subscriber's premises. As mentioned above, this traffic can include known web traffic, such as packetized data arranged according to known TCP/IP protocol, as well as compressed-voice data packets carrying the subscribers computer-assisted telephone calls. The subscriber to the compressed-voice data service according to methods and apparatus of the present invention uses a "special" prefix or less preferably, a special dial number (DN). which the local office has assigned to identify such subscribers. Most preferably, the subscriber's computer automatically appends the special prefix when placing a computer-assisted call to the telecommunication network.

When placing a normal telephone call, the subscriber dials a DN and the end-office sets up the call in a known manner. With the subscriber's telephone on-hook (i.e. the phone not in use), the subscriber using compressed voice service dials a DN using their computer (or dedicated device), with the computer adding a prefix to the DN, thus alerting the end-office to setup the toggle switches at the origination and destination sites.

Referring to FIG. 2, connections are made from line units 210 to a switching module processor 220 which detects the specially assigned prefix or dial number during call setup and sets the various toggles of the line unit 210 accordingly, in a manner to be described herein. For example, referring to FIG. 4, toggle 422 may be set to normally direct incoming traffic to line 224 at the output of line unit 210. Referring again to FIG. 2, signals on output line 424 exit the line units 210 and travel along the switching module 200 and other infrastructure of the telecommunications network, to arrive at the input line 226 of an Internet Service Provider (ISP) modem 204, for further processing and transmission in a known manner. Referring again to FIG. 4, during call setup, upon detection of a specially assigned prefix or dial number, switching module processor 220 directs toggle 422 to direct incoming traffic to compressed-voice module 214, along line 426, so that the incoming compressed-voice data packets from the subscriber are processed in preparation for further transmission in the telecommunications network.

The compressed-voice module 214 shown in FIG. 4 comprises a modem 430 connected to line 426, thereby receiving data packets from the subscriber. As mentioned above, these data packets may be comprised of known types of web data in the form of TCP/IP packets or the like, as well as compressed-voice call data in the form of compressed-voice data packets, described above. Accordingly, a known packet separator, coupled to modem 430 by line 434 is employed to separate web data traffic from compressed-voice data packets outputted on line 436. Preferably, the web traffic is diverted to line 438 and, after processing by known modem 440, travels along line 442, through toggle 444 to output line 424 so as to be routed to the ISP modem 204, shown in FIG. 2.

Referring again to FIG. 4, compressed-voice data packets are sent from packet separator 432 along line 436 to a known sequencer 448 which recovers the substantially continuous compressed-voice data bitstream from the series of compressed-voice data packets, by removing the packet header that is used between the subscriber and the end office, leaving other headers associated with other layers of protocol, intact. The extracted compressed-voice data bitstream is outputted on line 450, where it enters the compressed-voice multiplexer 230. As shown in FIG. 2, data from two subscribers are fed into the compressed-voice multiplexer 230. As will be seen herein, it is contemplated that data from a larger number of subscribers can be combined in the compressed-voice multiplexer 230. Accordingly, the present invention contemplates switching modules accommodating more than two subscribers, with respective line units and compressed-voice modules provided for each subscriber in the manner described above.

Shown in the bottom of switching module 200 is a time-division multiplexed signal path 236 or time-switched interface of known type, comprising a sequence of time slots, such as time slots 238, 240 shown in FIG. 2. In the preferred embodiment, signal path 236 comprises a sequence of time slots carrying respective voice frequency/DS0 channels. As is known in the art, a time division multiplexer (not shown) assigns each channel a specific time slot, thus combining several digital signals in a single path and sending those signals sequentially. In this preferred arrangement, 24 channels are time division multiplexed together and transmitted over a common path referred to as a digital carrier system which operates at a DS1 rate of 1.544 megabits per second (Mbps). In the preferred embodiment, the time-division multiplexed signal path 236 carries data in its time slots which have a data rate of 64 Kbps. A plurality of subscriber's compressed-voice call data are combined for transmission in a single time slot of the signal path 236. Accordingly, the data rate output from the vocoders 120 is prearranged to be a fraction of the time slot data rate. It has been found convenient to assign data from as many as eight subscribers to each time slot employed in carrying out the present invention. Of course, other numbers of subscribers can be assigned, as may be desired. Accordingly, in the preferred embodiment described herein, the data rate output from the vocoders is prearranged to be approximately 8 Kbps, and most preferably not substantially lower than 8 Kbps. Thus, given the continuous nature of the vocoder bitstream output, up to eight subscriber compressed-voice data channels can be accommodated for each 64 Kbps time slot assigned to carry compressed-voice data traffic.

Referring again to FIG. 2, the combined compressed-voice data traffic from multiple subscribers exits multiplexer 230 along line 244 so as to be injected into time slot 240 of time-division multiplexed signal path 236. Accordingly, multiplexer 230 also comprises any necessary known signal injector equipment which may be required to insert the combined compressed-voice data traffic into time slot 240. It is contemplated by the present invention, that the necessary signal injector equipment could be as simple as a wire or other circuit connection to the equipment carrying the signals on time-division multiplexed signal path 236. Also represented in FIG. 2 is the time slot 238 which carries web traffic originating at the subscriber's premises and outputted from line units 210 on lines 224. It will be appreciated by those skilled in the art that such web traffic need not be conveyed along the same time-division multiplexed signal path as that carrying the combined compressed-voice data traffic. Further, although the time slot 240 of time-division multiplexed signal path 236 is shown being inserted with compressed-voice data traffic from subscribers sharing a common switching module, the present invention also contemplates filling one or more time slots with compressed-voice data from subscribers through multiple switching modules. Such diverse possibilities may be required for efficient routing of compressed-voice calls from one geographical region to another.

Referring now to FIGS. 2 and 3, combined compressed-voice data traffic is fed via one or more time slots of time-division multiplexed signal path 236 along line 208. The traffic is processed by communications module processor (CMP) 300. In the arrangement illustrated in FIG. 3, outputs from two switching modules are shown being fed into a common communications module processor. As will be appreciated by those skilled in the art, signals from different time-division multiplexed signal paths can be broken apart and recombined at several points along their route. By way of example of such recombining, the traffic is shown being fed along lines 304 to a switching module 302. The traffic is then inserted, combined with, or extracted from a time-division multiplexed signal path 306 and fed to through a multiplexer/demultiplexer 310 to a known trunk unit 312. From there, the traffic is carried along lines 314 to PSTN 120. It should be understood that this manipulation of compressed-voice data traffic with respect to time-division multiplexed signal path 306 is offered by way of example only and may not be required in certain applications. According to principles of the present invention, utilizing known multiplexing and demultiplexing techniques, compressed-voice data carried in time slots of a first time-division multiplexed signal path may be recombined in other time slots of the same or other time-division multiplexed signal paths as may be required for efficient transmission from one geographical location to another.

Figure 5:
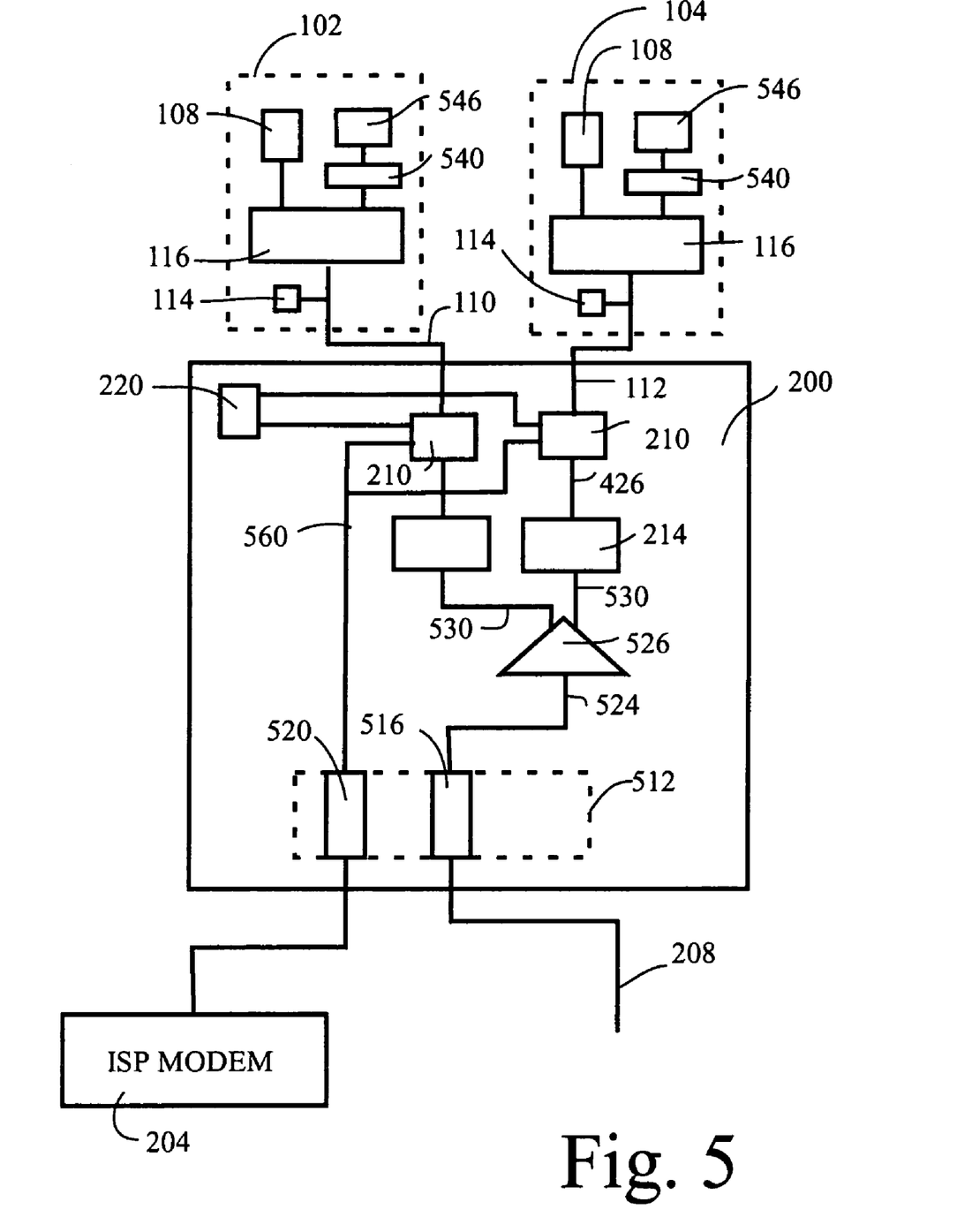
FIG. 5 is another partial representation of the compressed-voice apparatus of FIG. 1.

Referring to FIGS. 3 and 5 and initially to FIG. 3, upon arrival of compressed-voice data traffic, the time-division multiplexed signal path carrying the compressed-voice time slot data is routed through switching module 302 and communications module processor 300 to switching module 200 shown in FIG. 5. The switching module 200 has been described above with reference to FIG. 2 to illustrate the sending of compressed-voice call data. As will now be explained with reference to FIG. 5, switching module 200, in one embodiment, also comprises circuitry for receiving compressed-voice call data from remote locations in the telecommunications network. As can be seen in FIG. 5, a time-division multiplexed signal path 512 carries a time slot 516 containing a compressed-voice data package and, optionally, a time slot 520 containing conventional non-call related data, such as IP packet data also destined for delivery at subscriber premises 102, 104.

The compressed-voice data package is extracted by a signal extractor from time slot 516, traveling along line 524 to a demultiplexer 526 which separates the compressed-voice data package into a plurality of compressed-voice data signals outputted on lines 530. Although only two output lines 530 are shown in FIG. 5, the present invention contemplates that a larger number of compressed-voice data signals may be contained within the time slot and, after processing in the manner described herein, would be delivered to additional subscriber premises not shown in the drawings. As illustrated in FIG. 5, the compressed-voice data signals exiting demultiplexer 526 are routed through corresponding compressed-voice modules 214 and line units 210, being delivered along local loops 110, 112 to subscriber premises 102, 104.

Referring now to FIG. 4, line 530 of compressed-voice module 214 contains one of the compressed-voice data signals extracted and separated from the compressed-voice data package in demultiplexer 526. The compressed-voice and data signal on line 530 comprises a substantially continuous digital bitstream which is arranged into compressed-voice data packets in sequencer 452. Ignoring for the moment the optional intervening packet sequencer 454, the compressed-voice data packets are then transmitted by a modem 454 along line 458 to toggle 460. As mentioned above, the toggles of line units 210 are operated under control of switch module processor 220. In order to reach the modem 116 of the destination subscriber, toggle 460 is operated by switch module processor 222 to direct the compressed-voice data packets through the 2 wire-to-4 wire converter 412 and the intervening local loop 464 to the subscribers modem 116.

Referring again to FIG. 5, it is assumed that the local loop 464 of FIG. 4 is the same as local loop 110, and that a compressed-voice call is placed to the subscriber premises 102. The incoming compressed-voice data packets are received by modem 116 and are routed to a depacketizer 540 which extracts the substantially continuous compressed-voice data signal. The compressed-voice data signal is then sent to a known audio unit 546. The audio unit 546 comprises one or more electronic components, hardware or software components that converts the substantially continuous bitstream of the compressed-voice data signal into an audible signal.

Referring again to FIG. 5, incoming conventional non-call related data such as IP packet data is accommodated by apparatus and methods according to the present invention. The non-call related data is, in one embodiment, merely routed by apparatus and methods of the present invention, and is processed in the usual manner by known equipment and methods. As shown in FIG. 5, incoming IP packet data carried by time slot 520 is directed to line units 210 along incoming line 560. Referring to FIG. 4, data on line 560 is routed through toggle 470 and line 472 to a modem 474 of known construction. After traveling along line 476, the non-call related data, herein assumed to be IP packet data for purposes of illustration, is combined with call-related packet data at packet sequencer 454. Both call-related packet data and non-call related data are then sent by modem 456 to the subscriber, in the manner indicated above. Modem 116 at the subscriber's premises may include a packet separator of known type to divide the incoming data to either the resources 108 (for non-call related data) or the depacketizer 540 (for the compressed-voice call packet data). If desired, subscriber service may be restricted to compressed-voice call service only, in which event, the toggle 470, modem 474 and packet sequencer 454 may be omitted.

Referring again to FIG. 4, operation of the toggles in line units 210 will now be reviewed. As mentioned, in one embodiment, control of the toggles is carried out during call setup by signals from the switching module processor 220, along lines not shown in the figures. When placing a normal telephone call, the subscriber dials a dial number (DN) and the end-office sets up the call in a known manner. With the subscribers telephone not in use, the subscriber using compressed voice service initiates operation of the computer; which adds a prefix to the DN, thus alerting the end-office to setup the toggle switches at the origination and destination sites. The switching module processor, in a first embodiment, instructs the outgoing toggles 422, 444 to route data on line 416 to output line 424. Thus, the line unit 210 is preset for conventional subscriber service with the subscriber's outgoing conventional calls and conventional non-call related data being the routed to the PSTN and ISP modem, respectively. During call setup, upon detection of a request for compressed-voice call service, switching module processor 220 diverts traffic on line 416 to modem 430, routing compressed-voice data packets and non-call related data to packet separator 432 in the manner described above. During this operation, conventional calls placed by the subscriber using known telephone apparatus 114 is suspended, and toggle 444 is set during call setup to receive input from modem 440, directing non-call related data to the ISP modem 204. The present invention also contemplates operation in which conventional telephone calls are routed through line unit 210 along with other non-call related data, such as IP packet data. When the subscriber goes online to surf the web, the end office preferably uses the DN of the ISP, with the toggle switches routing the traffic through compressed-voice module 214. A caller on the net uses special signaling packets between the subscriber's computer and the compressed-voice module 214, advising the telecommunications network that the subscriber wants to dial out a number.

Referring again to FIG. 4, operation of toggles 460 and 470 will now be described with reference to incoming traffic, destined for delivery at the subscriber's premises serviced by the line unit 210 and the compressed-voice module 214. In a known manner, switching module processor 220 is alerted by switching module 200, system signals or other known means that a time slot of interest has been received at switching module 200. The switching module processor 220 has previously set toggles 460, 470 to route incoming data to line 418. Upon arrival of compressed-voice data signals on line 560, the switching module processor 220 operates toggle 470 to divert incoming non-call related data to modem 474. Toggle 460 is also operated to direct data on the line 458 to be carried on line 418, for delivery to the subscriber in the manner indicated above. A callee receiving a call on the net, who subscribes to compressed voice service, needs to receive another special signaling packet which alerts the callee that a computer assisted call is being received. If a callee on the net does not have compressed voice service, communications are carried out in a known manner. For example, a callee "onhook" is alerted to incoming calls in a known manner. If the caller is using compressed voice service, the toggle switches are setup for routing through compressed-voice module 214, with the compressed voice data being converted to PCM voice before leaving the end-office.

Numerous alternative embodiments of the present invention exist. For example, the toggles of line unit 210 can be left in their former state of operation and set as required for each call placed between the subscriber and the local switching office, whether that call invokes compressed-voice call service or not. Further, additional known circuitry can be added to route traditional telephone calls to and from the subscriber's telephone instrument 114, whether in the presence of compressed-voice call service or not. Also, as mentioned above, compressed-voice call service can be provided to the exclusion of non-call related traffic such as IP data packets and/or traditional telephone call traffic. However, as can be seen from the above, methods and apparatus according to principles of the present invention can allow compressed-voice call service to coexist with other types of service provided by known telecommunications networks.

Figure 6:
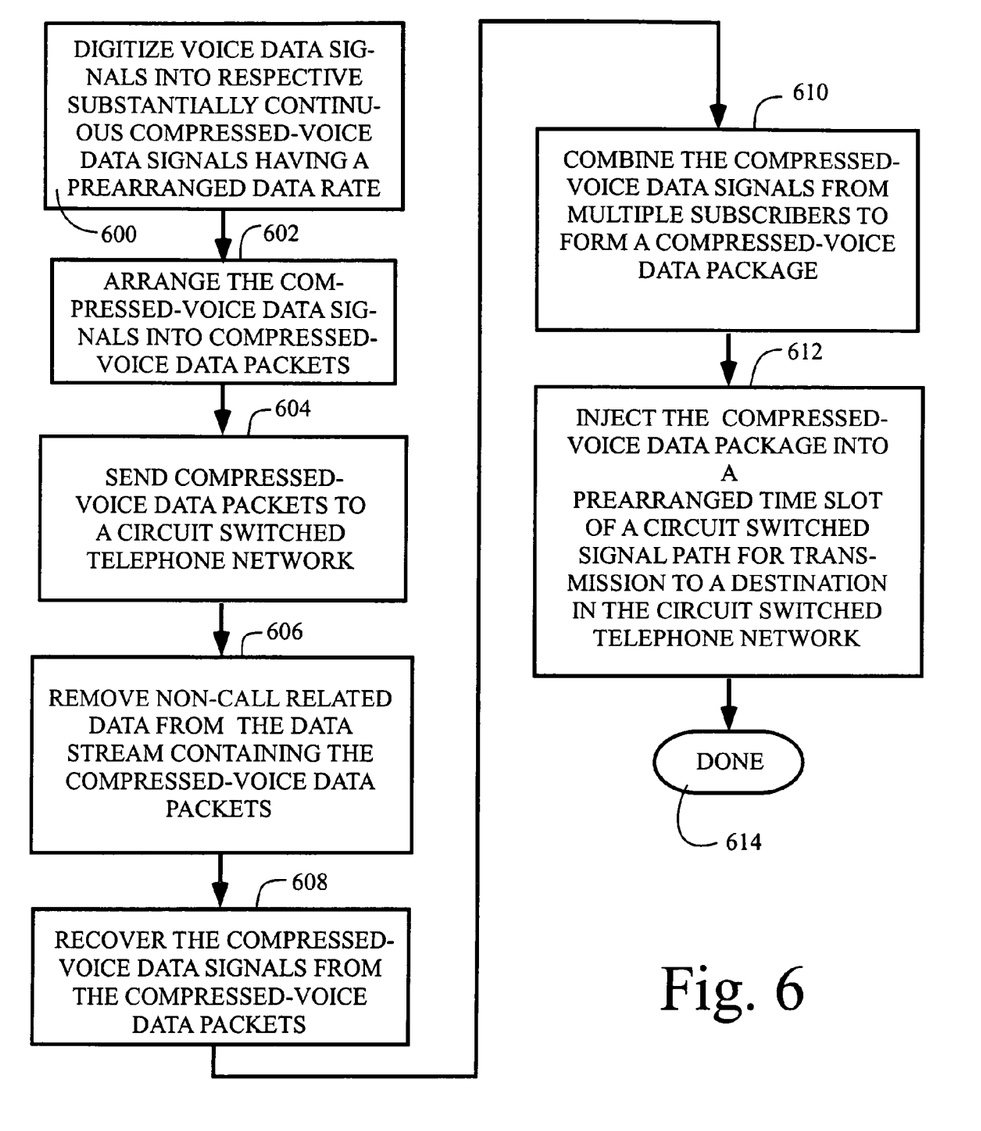
FIG. 6 is a flow chart of processing according to a first method of this invention.

An illustrative description of exemplary operation of the apparatus for placing computer-assisted calls incorporated in a known telecommunications network 100 is presented, for explanatory purposes. Operation of the apparatus for sending a compressed-voice call will be presented in FIG. 6 and operation of the apparatus for receiving a compressed-voice call will be presented in FIG. 7. Turning now to FIG. 6, a flow chart of processing according to this invention is shown. In box 600, voice data signals from a plurality of known telephone instruments or other voice devices 122 are digitized by respective vocoders 120 into a plurality of substantially continuous compressed-voice data signals having prearranged data rates. Preferably, the compressed-voice data signals are digitized so as to have substantially the same prearranged data rate. Those skilled in the art will recognize that reference herein to "substantially" the same data rate or to a data rate not "substantially" lower than a reference data rate bears significance to the particular implementation involved, and that some implementations are more sensitive to small changes to data rates than others.

Processing moves to box 602 where the compressed-voice data signals are arranged into compressed-voice data packets by a plurality of packetizers 126 located at respective subscriber's premises. Processing continues in box 604 where compressed-voice data packets are sent by a plurality of subscribers' modems 116 to a switching module 200 of a local switching office 106 of a circuit-switched telephone network. Processing continues in box 606 where non-call related data is removed from the data stream containing the compressed-voice data packets by packet separators 432 assigned to respective subscribers. In box 608 processing is continued where the compressed-voice data signals are recovered from the compressed-voice data packets by a plurality of sequencers 448 servicing respective subscribers. Processing continues in box 610 where the compressed-voice data signals from multiple subscribers are combined in multiplexer 230 to form a compressed-voice data package. Next, processing is continued in box 612 where the compressed-voice data package is injected by line 244 into a prearranged time slot 240 of a circuit-switched signal path 236, 4 transmission to a destination in the circuit-switched telephone network. This concludes sending of compressed-voice calls as indicated in box 614. At this point, the compressed-voice calls are sent throughout the PSTN in a known way.

Figure 7:
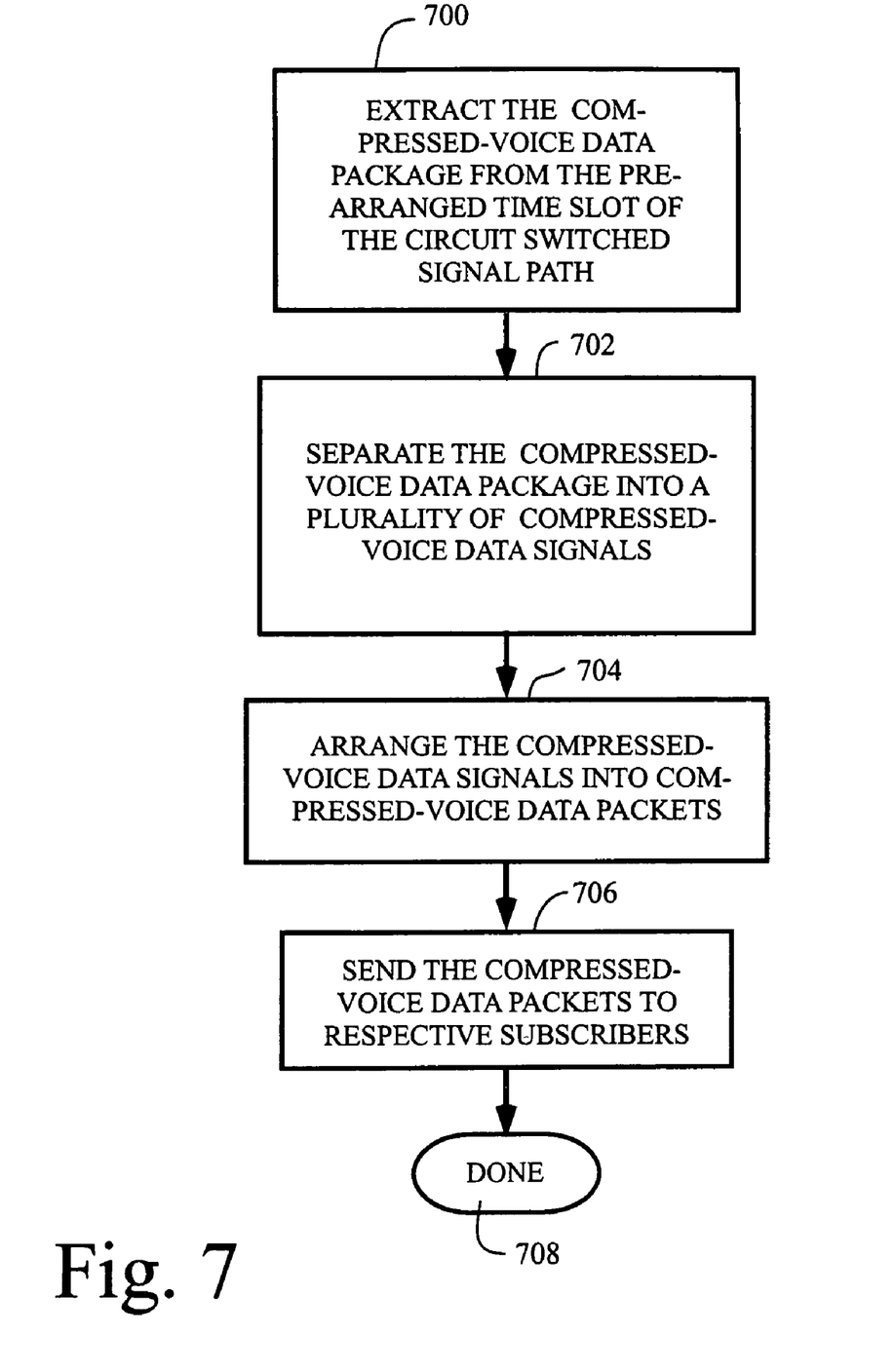
FIG. 7 is a flow chart of processing according to a second method of this invention.

Operation of the apparatus for receiving a compressed-voice call is now presented in FIG. 7. Turning now to FIG. 7, a flow chart of processing according to this invention is shown. In box 700, upon arrival of time slot 516 in a circuit-switched signal path 512, the compressed-voice data contained in the time slot is extracted by line 524. Processing continues in box 702 where the compressed-voice data package is separated into a plurality of compressed-voice data signals by demultiplexer 526. Next, processing is continued in the box 704 where the plurality of compressed-voice data signals are arranged into compressed-voice data packets by a plurality of sequencers 452 serving respective subscribers. Next, the compressed-voice data packets are sent to respective subscribers by modems 456 sending the signals through line units 210. This concludes receiving of compressed-voice calls as indicated in box 708.

As can now be seen, according to certain aspects of the present invention, circuit-switched telephone networks are employed to carry compressed voice, allowing subscribers to enjoy voice and data communications simultaneously, while still providing low cost and high quality voice service. As will be apparent to those skilled in the art, the present invention contemplates both analog subscriber service (e.g. via analog line units) and digital subscriber service (via DSL service, for example).

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. An apparatus, comprising:
a line unit and a compressed-voice module, wherein the compressed-voice module comprises a sequencer and a packet separator coupled to said sequencer;
wherein said packet separator receives data packet traffic from an originating subscriber premises, wherein the data packet traffic comprises compressed-voice data packets and second data packets;
wherein said compressed-voice data packets have a first identifying header; said second data packets have a second identifying header; and said packet separator diverts said second data packets from said compressed-voice data packets upon detection of the second identifying header;
wherein said sequencer extracts first compressed-voice data signals from the compressed-voice data packets;
the apparatus further comprising a multiplexer that combines a plurality of substantially continuous compressed-voice data signals from a plurality of respective originating subscriber premises into a compressed-voice data package, wherein the plurality of respective originating subscriber premises comprise the originating subscriber premises, wherein the plurality of substantially continuous compressed-voice data signals comprise the first compressed-voice data signals from the sequencer; and
a signal injector injecting said compressed-voice data package into a prearranged time slot, of a circuit-switched, time division multiplexed (TDM) signal path of a public switched telephone network (PSTN), that is dedicated for the compressed-voice data package;
the apparatus further comprising a switching module of a local switching office of the PSTN, wherein the switching module comprises the line unit, the compressed-voice module, the sequencer, the multiplexer, and the signal injector.

2. The apparatus of claim 1 wherein said circuit-switched, time division multiplexed signal path comprises a time division multiplexed signal path carrying a sequence of time slots;
wherein at least one time slot of the sequence of time slots is dedicated for compressed-voice data packages.

3. The apparatus of claim 1 further comprising:
a plurality of sequencers coupled to said multiplexer, wherein the plurality of sequencers comprise the sequencer;
wherein the switching module comprises the plurality of sequencers;
wherein the plurality of sequencers receive a plurality of compressed-voice data packets that comprise the plurality of substantially continuous compressed-voice data signals;
wherein the plurality of sequencers recover said plurality of substantially continuous compressed-voice data signals from the plurality of compressed-voice data packets.

4. An apparatus, comprising:
a switching module of a local switching office of a public switched telephone network, wherein the switching module comprises a multiplexer, a signal injector, a plurality of sequencers, a plurality of line units, and a plurality of compressed-voice modules;
the multiplexer combining a plurality of substantially continuous compressed-voice data signals from a plurality of originating subscriber premises into a compressed-voice data package;
the signal injector injecting said compressed-voice data package into a prearranged time slot, of a circuit-switched, time division multiplexed (TDM) signal path of a public switched telephone network (PSTN), that is dedicated for the compressed-voice data package;
the plurality of sequencers coupled to said multiplexer, having a plurality of compressed-voice data packets containing said substantially continuous compressed-voice data signals and recovering therefrom said substantially continuous compressed-voice data signals;
the plurality of line units coupled to the plurality of sequencers and a plurality of compressed-voice modules containing said plurality of sequencers, coupled to said plurality of line units,
wherein said compressed-voice modules further comprise packet separators coupled to said sequencers,
wherein said packet separators receive data packet traffic from the plurality of originating subscriber premises which comprises the compressed-voice data packets and second data packets, wherein said packet separators divert said second data packets from said plurality of sequencers; and
wherein said compressed-voice data packets have a first identifying header; said second data packets have a second identifying header; and said packet separators divert said second data packets from said compressed-voice data packets upon detection of the second identifying header.

5. The apparatus of claim 4 wherein:
said plurality of line units are coupled to a second signal path distinct from said circuit-switched TDM signal path;
said packet separators are coupled to said line units; and
said second data packets separated from said plurality of sequencers are sent to said line units by said packet separators for sending along said second signal path.

6. The apparatus of claim 4, the switching module further comprising:
- a signal extractor extracting a compressed-voice data package from the prearranged time slot of the circuit-switched TDM signal path;
- a plurality of receiving sequencers of a circuit-switched telephone network;
- a demultiplexer coupled to said plurality of receiving sequencers, separating said compressed-voice data package into a plurality of compressed-voice data signals; and
- the plurality of receiving sequencers receiving the compressed-voice data signals and arranging the compressed-voice data signals into compressed-voice data packets.

7. The apparatus of claim 6 further comprising a plurality of sending modems coupled to respective ones of said receiving sequencers to transmit compressed-voice data packets to respective subscribers.

8. The apparatus of claim 4 wherein said substantially continuous compressed-voice data signals have a data rate not substantially lower than 8 kbps.

9. The apparatus of claim 4 wherein no more than eight of said compressed-voice data signals are combined into said compressed-voice data package.

10. A method, comprising the steps of:
- receiving, at a switching module of a local switching office of a circuit-switched telephone network, a plurality of compressed-voice data packets having a first identifying header along with a plurality of non-telephone call data packets having a second identifying header;
- separating, by a packet separator of the switching module, the plurality of compressed-voice data packets from the plurality of non-telephone call data packets based on at least one of the first and second identifying headers;
- recovering, by a sequencer of the switching module, a plurality of substantially continuous compressed-voice data signals from the plurality of compressed-voice data packets;
- combining, by a multiplexer of the switching module, said plurality of substantially continuous compressed-voice data signals to form a compressed-voice data package; and
- injecting, by a signal injector of the switching module, said compressed-voice data package into a prearranged time slot, of a circuit-switched, time division multiplexed (TDM) signal path of a public switched telephone network (PSTN), that is dedicated for the compressed-voice data package.

11. The method of claim 10 wherein said circuit-switched TDM signal path comprises a time division multiplexed signal path carrying a sequence of time slots.

12. The method of claim 10 wherein said substantially continuous compressed-voice data signals have a data rate not substantially lower than 8 kbps.

13. The method of claim 10 wherein no more than eight of said compressed-voice data signals are combined into said compressed-voice data package.

14. The apparatus of claim 1, wherein a bit rate of the first compressed-voice data signals is selected to be a fraction of a bit rate of the circuit-switched TDM signal path.

15. The apparatus of claim 2, wherein the at least one time slot of the sequence of time slots is dedicated for compressed-voice data packages of computer-assisted calls.

* * * * *